United States Patent [19]

Root

[11] 4,274,363
[45] Jun. 23, 1981

[54] WHELPER STRUCTURE

[76] Inventor: Barbara A. Root, 4194 W. 44th St., Edina, Minn. 55424

[21] Appl. No.: 110,783

[22] Filed: Jan. 9, 1980

[51] Int. Cl.³ .................................... A01K 29/00
[52] U.S. Cl. ..................................... 119/1; 119/61
[58] Field of Search ............... 119/1, 15, 61; 206/557, 206/564

[56] References Cited

U.S. PATENT DOCUMENTS

| | | | |
|---|---|---|---|
| 3,195,510 | 7/1965 | Bernstein | 119/61 |
| 3,205,861 | 9/1965 | Moore | 119/61 |
| 3,771,493 | 11/1973 | Chandor | 119/1 |
| 4,085,706 | 4/1978 | Evans | 119/61 |
| 4,183,435 | 1/1980 | Thompson et al. | 206/557 |

FOREIGN PATENT DOCUMENTS 749780  7/1933  France ........................ 119/61
358036  9/1931  United Kingdom ........ 119/1

*Primary Examiner*—Gene Mancene
*Assistant Examiner*—Robert P. Swiatek
*Attorney, Agent, or Firm*—Burd, Bartz & Gutenkauf

[57] ABSTRACT

An animal maternity structure having an upright annular side wall and bottom wall forming a circular chamber for accommodating a mother animal and her offspring. The side wall has an annular rail projected into the chamber above the bottom wall to prevent the mother animal from injuring her offspring. An outwardly directed flange attached to the side wall facilitates location of the structure in a corner of a room.

24 Claims, 6 Drawing Figures

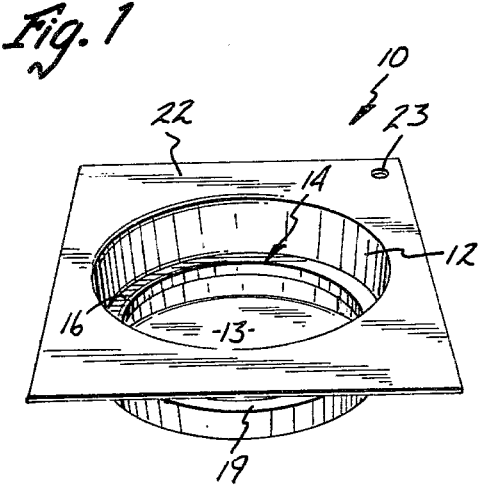
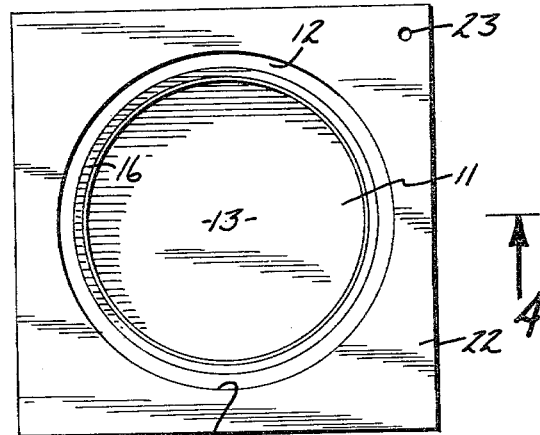
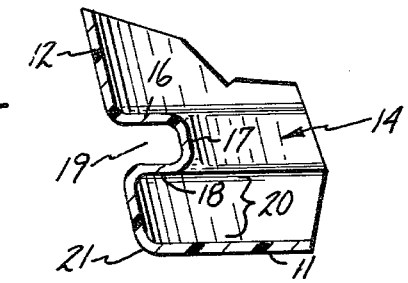
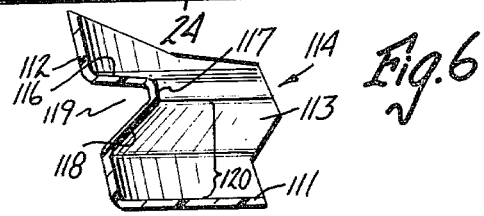
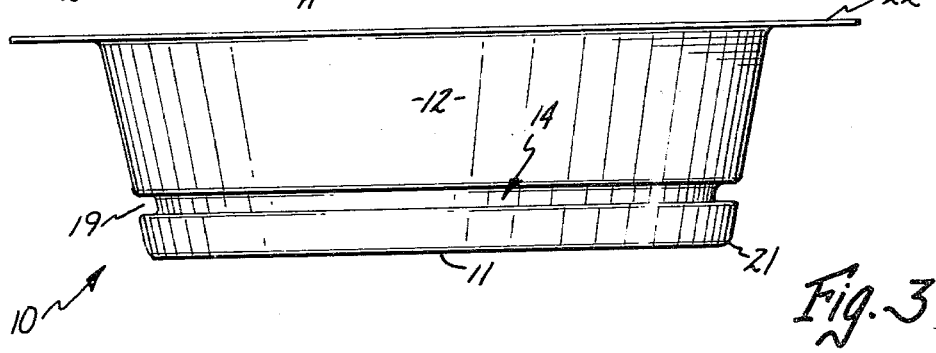
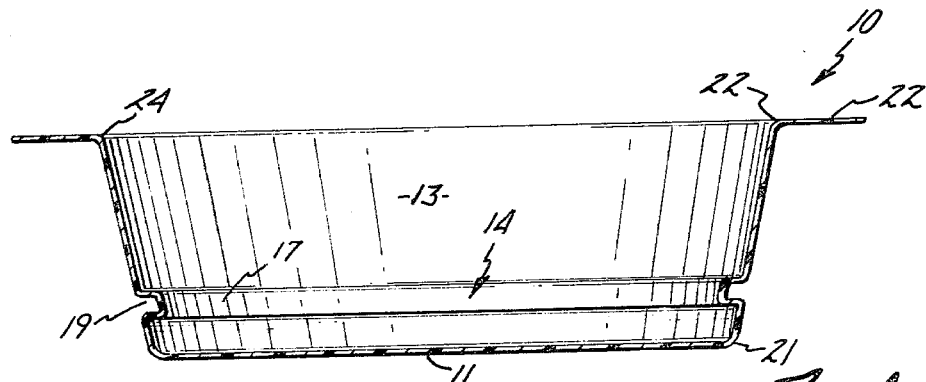

WHELPER STRUCTURE

SUMMARY OF INVENTION

The invention relates to an animal maternity structure used during the birth and initial period of growth of young animals. More particularly, the invention is directed to a whelper structure used with mother dogs during and after the birth of puppies. Dog owners utilize containers or boxes in which the mother dog delivers puppies and nurses the puppies for a period of time. The containers are home-made box-like structures generally made of plywood or other wood products. Boxes made of cardboard have also been used as whelping boxes.

The whelping structure of the invention has a circular shaped space or chamber for accommodating the mother dog and her puppies. The structure has a generally circular base joined to an upright annular side wall surrounding the chamber. The top of the chamber is open to facilitate the movement of the mother dog into and out of the chamber. The side wall has inwardly directed rail means to prevent the mother dog from injuring the puppies when she rests or leans against the side wall. Each year many puppies are lost when they are crushed between the mother dog and the side wall of the whelping box. The rail means permits the puppies to squeeze behind the mother without being injured. The annular wall having a circular shape simulates the natural environment of mother dogs during whelping. The circular configuration of the side wall directs any puppies that wander from the mother back to the mother dog. An outwardly directed flange is attached to the top of the side wall. One or more sections of the flange have right angle edges which facilitate location of the structure in a corner of a room. The flange has a hole used to hang the structure from a nail or peg attached to a support, such as a wall, when not in use.

In one form, the whelping structure is a one-piece unit made of lightweight and easily cleaned material, as plastic. The unit has a circular flat base with an upwardly curved outer peripheral edge. An annular outwardly tapering side wall is joined to the peripheral edge. The side wall has a circular rail located above the base and projected into the chamber surrounded by the side wall. The rail is continuous and has rounded circular edges to minimize pressure areas on the female dog and her puppies. The top of the side wall has an outwardly curved outer peripheral edge joined to an outwardly projected flat flange. The flange has a square outer edge to facilitate location of the structure in a corner of a room. The flange has holes to accommodate a nail or peg used to hang the structure from a support.

An object of the invention is to provide a whelping structure that is sturdy in construction, easy to clean, and protects young animals from being squeezed and crushed by the mother animal. Another object of the invention is to provide a whelping structure that simulates the natural circular shape of a den or nest made by animals during birth of the young animals, as a litter of dogs. A further object is to provide a whelping structure that can be stored in a convenient manner. These and other objects and advantages of the whelping structure of the invention are embodied in the structure shown in the drawings and hereinafter described.

IN THE DRAWINGS

FIG. 1 is a perspective view of the whelper structure of the invention;

FIG. 2 is a top plan view of FIG. 1;

FIG. 3 is an enlarged side view of FIG. 1;

FIG. 4 is an enlarged sectional view taken along the line 4—4 of FIG. 2;

FIG. 5 is an enlarged fragmentary sectional view of the rail in a side portion of the whelper structure of FIG. 1; and FIG. 6 is a sectional view similar to FIG. 5 of a modification of the shape of the rail.

DESCRIPTION OF PREFERRED EMBODIMENTS

Referring to FIG. 1, there is shown a whelper structure indicated generally at 10 useable as a maternity hutch for animals, such as dogs. Whelper structure 10 is used by dogs during the delivery of the offspring or puppies and for a period of time after the birth of the puppies. Structure 10 can be used by female animals and their offspring, other than dogs, during the maternity period. The following description is directed to a whelping structure for dogs.

Whelper structure 10 has a circular generally flat base or bottom wall 11. Base 11 is adapted to rest on a flat support, such as a floor. An electric heating pad or other source of heat can be placed under base 11 to provide heat for dogs in the structure. Base 11 has an outer annular peripheral edge 21 joined to an upwardly directed side wall 12. Edge 21, shown in FIG. 5, has an upwardly curved or rounded shape. Side wall 12 has an annular cylindrical shape and tapers upwardly and outwardly from edge 21. Side wall 12 has the general shape of a truncated cone. The side wall 12 can have other annular shapes, as oval, elliptical, oblong, and the like. Base 11 and side wall 12 provide a cylindrical chamber or space 13 for accommodating a mother dog and her puppies. Cylindrical space 13 simulates the natural environment of a mother dog during whelping. The natural environment is a circular nest or hole in the ground. The continuous curved or annular configuration of side wall 13 limits the wandering of puppies away from the mother dog. The side wall does not have any square corners that confuse wandering puppies. A wandering puppy will be directed by the annular side wall 12 back to the mother dog.

A continuous rib or rail indicated generally at 14 is integral with side wall 12. Rail 14 projects into chamber 13 above base 11 to form a structure for protecting the puppies from being compressed or crushed by the mother dog as she leans on side wall 12. Rail 14 is a continuous annular flange having a generally U-shape. The rail 14 has inwardly tapering top and bottom portions 16 and 18 and a generally upright side portion 17 joined to the top and bottom portions 16 and 18. The corners of rail 14 are rounded or convexly curved to eliminate sharp edges. The outside of wall 12 has an inwardly directed continuous annular groove 19 formed by the top, bottom, and side portions 16–18 of rail 14. As shown in FIG. 5, rail 14 is located a vertical distance 20 above bottom wall 11. Distance 20 and size of rail 14 can vary with the size of the whelper structure and with the type and size of animals that use the whelper structure.

A modification of the shape of the rail is shown in FIG. 6. The parts of the structure of FIG. 6 that correspond to the parts of the structure of FIGS. 1-5 have the same reference numbers with a prefix 1. Rail 114 is integral with side wall 112. The rail 114 is formed by providing side wall 112 with an outwardly open groove 119 located above bottom wall 111. Rail 114 is a continuous annular rib having an inwardly directed top portion 116, inside end portion 117, and upwardly and inwardly tapering bottom portion 118.

Portion 118 tapers upwardly and inwardly at an angle of about 45 degrees from the horizontal plane of bottom 111. Other angles can be used. The tapered portion 118 provides a broad surface which guides puppies in a circular path around whelping chamber 113.

The corners of rail 114 are round and blend with the portions of the rail to minimize sharp or abrupt edges. End portion 117 is spaced a vertical distance 120 above bottom wall 111. Distance 120 can vary with the size of the whelper structure and in accordance with the type and size of animals that use the whelper structure.

A generally flat outwardly directed flange 22 is secured to the top edge of side wall 12. Flange 22 preferably has a square outline permitting whelper structure 10 to fit into a corner of a room. One corner of flange 22 has a hole 23 to facilitate the hanging of the whelper structure from a peg or nail attached to a support, as a wall or rafter. Flange 22 may contain one, two, or three corner sections. A single corner section can be placed in a room to facilitate the location of the whelping structure in the corner. The remaining portion of side wall 22 can have a turned down or curled edge to minimize sharp or protruded edges that can injure the dog.

Whelper structure 10 is made of a one-piece durable, rigid and relatively light weight material. Preferably, a one-piece molded plastic material, including materials as polyethylene, polystyrene, and the like, is used to make whelper structure 10.

An example of one size of a whelping structure is as follows. The circular bottom base 11 has a diameter of 66 cm or 26 inches. Side wall 12 is 25.4 cm or 10 inches high. Rail 14 is a continuous inwardly directed annular rail elevated a distance of 5 cm or 2 inches from base 11. Rail 14 has a horizontal dimension of 2.54 cm or 1 inch and a vertical dimension of 2.54 cm or 1 inch. Flange 22 is a flat lip joined to the top edge of side wall 12. It has a square outline with outer dimensions of 76 cm or 30 inches by 76 cm or 30 inches.

A second embodiment of whelper structure 10 has a base 11 having a diameter of 76 cm or 36 inches. Side wall 12 has a height of 35.5 cm or 14 inches. Rail 14 has a horizontal extent of 5 cm or 2 inches and a vertical extent of 5 cm or 2 inches. The bottom of the rail is spaced 5 cm or 2 inches above base 11. Flange 22 is 106.5 cm or 42 inches square.

Whelping structure 10 can be of a larger size. The larger size structure can have two or more sections that are secured together.

The above described whelping structures are given as examples of specific sizes and construction. Other sizes and materials can be used to make the whelping structure of the invention. The size and location of rail 14 relative to the base 11 and height of side wall 12 can vary in accordance with the size and type of animal that is to use the structure. The size and shape of the top flange 22 can vary. Whelping structure 10 can be provided with a door or gate in side wall 12 above rail 17 to facilitate movement of the mother dog into and out of whelping chamber 13. Other changes in details of the structure can be made by those skilled in the art without departing from the invention. The invention is defined in the following Claims.

The embodiments of the invention in which an exclusive property or privilege is claimed are defined as follows:

1. A whelper structure for use by a female animal and her offspring, as a mother dog and her puppies, comprising: a base having an outer annular peripheral edge, an upright annular side wall joined to the outer annular peripheral edge of the base, said base and side wall providing a generally cylindrical space having an open top, means attached to said side wall above the base and projected into the space to protect the offspring from the female animal, said means comprising a continuous annular rail, said rail having top and bottom portions and an inside portion joined to the top and bottom portions, said inside portion being spaced inwardly from the side wall, and outwardly directed flange means attached to the side wall.

2. The structure of claim 1 wherein: the base is generally flat and circular.

3. The structure of claim 1 wherein: the side wall tapers upwardly and outwardly from the outer annular peripheral edge of the base.

4. The structure of claim 1 wherein: said rail is circular.

5. The structure of claim 4 wherein: the inside portion of the rail has a circular inside surface.

6. The structure of claim 1 wherein: the annular side wall has a circular inside surface, and said annular rail is a continuous circular rail.

7. The structure of claim 6 wherein: the inside portion of the circular rail has an inside circular surface.

8. The structure of claim 1 wherein: said flange means comprises at least one corner section having general normal outside edges.

9. The structure of claim 1 wherein: said flange means comprises a plurality of corner sections.

10. The structure of claim 9 wherein: each corner section has generally normal outside edges.

11. The structure of claim 1 wherein: said side wall has a top edge, said flange means being joined to the top edge and projected outwardly therefrom.

12. A whelper structure for use by a female animal and her offspring, as a mother dog and her puppies, comprising: a generally flat circular base having an outer circular peripheral edge, an upright circular side wall joined to the edge of the base, said base and side wall providing a generally cylindrical space having an open top, continuous circular rail means formed in said side wall, said rail means being spaced above the base and projected into the space to protect the offspring from the female animal, said rail means having top and bottom portions and an inside portion joined to the top and bottom portions, said inside portion being spaced inwardly from the side wall, and flange means joined to an upper portion of the side wall.

13. The structure of claim 12 wherein: the side wall tapers upwardly and outwardly from the outer annular peripheral edge of the base.

14. The structure of claim 12 wherein: the inside portion of the circular rail means has a circular inside surface.

15. The structure of claim 12 wherein: said flange means comprises at least one corner section having generally normal outside edges.

16. The structure of claim 12 wherein: said flange means comprises a plurality of corner sections.

17. The structure of claim 16 wherein: each corner section has generally normal outside edges.

18. A structure for use by a female animal and her offspring comprising: a base having an outer annular peripheral edge, an upright annular side wall joined to the outer annular peripheral edge of the base, said base and side wall providing a generally cylindrical space having an open top, and continuous rail means attached to said side wall above the base and projected into the space to protect the offspring from the female animal, said rail means having top and bottom annular portions and an inside annular portion joined to the top and bottom annular portions, said inside annular portion being spaced inwardly from the side wall.

19. The structure of claim 18 wherein: the base is generally flat and circular.

20. The structure of claim 18 wherein: the side wall tapers upwardly and outwardly from the outer annular peripheral edge of the base.

21. The structure of claim 18 wherein: said continuous rail means is a circular rail and said inside annular portion has s circular inside surface.

22. The structure of claim 18 including: flange means joined to a top portion of said side wall, said flange means projected outwardly from said side wall.

23. The structure of claim 22 wherein: said flange means has at least one corner section having normal outside edges.

24. The structure of claim 22 wherein: said flange means has a plurality of corner sections, each corner section having generally normal outside edges.

* * * * *